United States Patent
Wolf et al.

(10) Patent No.: US 8,395,759 B2
(45) Date of Patent: Mar. 12, 2013

(54) DEVICE FOR OPTICAL DISTANCE MEASUREMENT

(75) Inventors: Peter Wolf, Leinfelden-Echterdingen (DE); Matthieu Richard, Remoray (FR); Andreas Braun, Fellbach (DE); Joerg Stierle, Waldenbuch (DE); Bjoern Haase, Stuttgart (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 12/742,612

(22) PCT Filed: Oct. 14, 2008

(86) PCT No.: PCT/EP2008/063792
§ 371 (c)(1),
(2), (4) Date: Aug. 31, 2010

(87) PCT Pub. No.: WO2009/062798
PCT Pub. Date: May 22, 2009

(65) Prior Publication Data
US 2011/0007328 A1    Jan. 13, 2011

(30) Foreign Application Priority Data
Nov. 12, 2007 (DE) .......................... 10 2007 053 852

(51) Int. Cl.
*G01C 3/00* (2006.01)
*G01C 3/08* (2006.01)

(52) U.S. Cl. .......................................... 356/3; 356/4.01
(58) Field of Classification Search ...... 356/3, 614–624, 356/625–640
See application file for complete search history.

(56) References Cited

U.S. PATENT DOCUMENTS

| | | | |
|---|---|---|---|
| 3,714,435 A | 1/1973 | Bestenreiner et al. | |
| 5,311,012 A * | 5/1994 | Juds et al. | 250/222.1 |
| 5,354,983 A | 10/1994 | Juds et al. | |
| 6,603,534 B2 | 8/2003 | Seifert et al. | |
| 6,833,909 B2 | 12/2004 | Schmidt et al. | |
| 7,463,339 B2 | 12/2008 | Hinderling et al. | |
| 2002/0195549 A1 | 12/2002 | Frumker et al. | |
| 2009/0009747 A1 | 1/2009 | Wolf et al. | |
| 2009/0185158 A1 | 7/2009 | Wolf et al. | |

FOREIGN PATENT DOCUMENTS

| | | |
|---|---|---|
| DE | 2 012 995 | 3/1970 |
| DE | 100 51 302 | 4/2002 |
| DE | 101 30 763 | 1/2003 |
| DE | 10 2006 013 290 | 9/2007 |
| DE | 10 2006 013 292 | 9/2007 |
| WO | WO 02/42792 | 5/2002 |
| WO | WO 2005/064359 | 7/2005 |

* cited by examiner

*Primary Examiner* — Michael P Stafira
(74) *Attorney, Agent, or Firm* — Merchant & Gould P.C.

(57) ABSTRACT

The invention relates to a device for optical distance measurement, particularly to a handheld device, comprising a transmission unit (12) with a light source (17, 18) for emitting optical measurement radiation (13, 20, 22) onto a target object (15), and comprising a receiving unit (14) arranged at a distance from the optical axis (38) of the transmission unit (12) and equipped with at least one optical detector (54) for receiving optical radiation (16, 49, 50) reflected from the target object (15). According to the invention, the detector (54) of the receiving unit (14) comprises a detection surface (66), the optical surface of which has varying optical sensitivity.

10 Claims, 6 Drawing Sheets

DEVICE FOR OPTICAL DISTANCE MEASUREMENT

This application is a National Stage Application of PCT/EP2008/063792, filed 14 Oct. 2008, which claims benefit of Serial No. 10 2007 053 852.0, filed 12 Nov. 2007 in Germany and which applications are incorporated herein by reference. To the extent appropriate, a claim of priority is made to each of the above disclosed applications.

BACKGROUND

The invention relates to a device for optical distance measurement according to the preamble of the independent claim.

Optical distance-measuring devices as such have been known for some time and are now sold commercially in large numbers. These devices emit a modulated, respectively pulsed, light beam, which is directed toward the surface of a desired target object, whose distance from the device is to be ascertained. A portion of the returning light, which has been reflected or scattered by the target object, is detected by the device and used to ascertain the distance in question.

The application range of such distance-measuring devices generally comprises distances in the range of a few centimeters to several hundred meters. Depending upon the paths to be measured and the reflectance of the target object, different requirements result for the light source, the quality of the measurement beam as well as for the detector.

The optical distance-measuring devices known from the technical field can basically be divided up into two categories depending on the configuration of the transmission and reception channels necessarily present in the device.

On the one hand, there are devices with which the transmission channel is disposed a certain distance away from the reception channel so that the respective optical axes extend in parallel to each other but at a distance away from each other. On the other hand, there are monoaxial measuring devices with which the reception channel extends coaxially with the transmission channel.

The former biaxial measurement systems have the advantage that a complex beam-splitting system is not required to select the returning measurement signal, thereby also enabling, e.g., optical crosstalk from the transmission path directly into the reception path to be suppressed to a greater extent.

On the other hand, biaxial distance-measuring devices have among other things the disadvantage that detection problems may arise due to parallax when close-range distance measurements are performed. In this case, the image of the target object on the detector surface of the device—said image being unambiguously located on the detector even when target distances are great—moves increasingly further away from the optical axis of the reception path as the measurement distance decreases, and in addition the beam cross-section in the detector plane changes considerably. As a result, the measurement signal that is detected may approach zero in the close range of detection, i.e. when the distance between the target object and the measuring device is short, if no further measures are taken in the device.

Although measuring devices of this type can be optimized for a certain distance range, this requires, however, that the measuring range that is actually accessible to the measuring device be substantially limited.

The German patent publication DE 10 130 763 A1 makes a device known for optically measuring distance over a large measuring range, which includes a transmission unit with a light source for emitting modulated optical radiation toward a target object, and with which the receiving unit having an optical detector disposed in this measuring device, which serves to receive the optical radiation returning from the target object, is located on a reception axis, which is disposed at a distance away from the optical axis. The active, photosensitive surface of the detector of the receiving unit described in the German publication DE 10 130 763 A1 tapers in the direction of a beam displacement for decreasing target object distances that results due to a parallax of the returning measurement radiation.

The German patent publication DE 10 051 302 A1 makes known a laser distance-measuring device for close range and long-range that includes a special receiver with a transmission channel and a reception channel. The transmission channel consists of a transmission lens, in whose focal point a laser light source is disposed. The reception channel consists of a reception lens, in whose focal plane a receiver system is disposed. The optical axes of the transmission lens and the reception lens extend in parallel with each other with a finite spacing between them. The receiver system of the laser distance-measuring device described in the German publication DE 100 51 302 A1 is a photodiode chip system with at least two active photodiode surfaces disposed on a straight line, which intersects the optical axes of the transmission and reception lens of said device.

The German patent publication DE 10 2006 013292 A1 or also the German patent publication DE 100 51 302 A1 stipulates how an optimized reception behavior can be achieved with the aid of the geometric configuration of the active surface of a photodetector. The common aim of optimizing said reception behavior is thereby to simultaneously optimize three target parameters by distinguishing between a main detection surface for large distances and variably configured peripheral detection ranges for small distances:

On the one hand, the suitable configuration of the active photodetector surface ensures that a sufficiently strong measurement signal is available over the relevant distance range. This relates especially to the close range, wherein the centrally focused spot in the long range moves laterally relative to the spot position in the far field.

The second aim consists of configuring the photodetector surface such that the dynamics of the signal levels, which occur as a result of the optimal reception power with regard to shorter object distances increasing by the square of the reciprocal value of the distance, are to be evened out by the specific detector type. That means in the ideal case that the detector surface is configured such that a maximum signal level to be predetermined is not exceeded. The aim is thereby, for example, to avoid an overmodulation of the measurement amplifier.

Both optimizations are to be carried out under the constraint that the total available detector surface is to be held as small as possible so that as little as possible ambient light reaches the detector. The smaller the active surface is, the lower is the amplitude of the signal noise occurring as a result of ambient light. The detector surface thus forms the third target parameter to be optimized, i.e minimized.

The aim of the present invention is to ensure—based on a device for optically measuring distance according to the technical field—that firstly the most constant reception signal possible can be measured across the largest possible measuring range (i.e. a reception signal whose signal amplitude changes only slightly with the distance to the target object), that in so doing secondly the dependency on ambient light is minimized by an active detector surface, which is as small as possible and in addition thirdly the requirements for the adjustment precision of the optics of the device are held low.

This aim is met using a device according to the invention for optically measuring distance that includes the characteristics of the independent claim.

SUMMARY

In order to keep the positioning tolerance for the photodetector as small as possible and simultaneously achieve a deliberate damping of the signal component of the measurement signal when the distance to the object, respectively target distance, is short, the invention proposes to associate different optical sensitivities with different surface elements within this detector surface while maintaining a spacious and cohesive detector surface.

The device according to the invention for optically measuring distance has a transmission unit with a light source for emitting optical measurement radiation onto a target object, respectively target. Said device furthermore includes among other things a receiving unit arranged at a distance from the optical axis of the transmission unit and equipped with at least one optical detector for receiving optical radiation reflected from the target object. Said device is advantageously configured such that the detector of the receiving unit includes at least one detection surface, whose optically active surface has varying optical sensitivity in the direction of a beam displacement for decreasing target object distances.

The optical sensitivity of the optically active surface of the detector thereby advantageously decreases in the direction of the beam displacement for decreasing target object distances. In other words, the invention is characterized in that those surfaces, which are reached by the returning light of the measurement signal as the object distance increasingly decreases, are equipped with an increasingly denser optical filter function. There are consequently detector surfaces with a substantially 100% sensitivity, in which the light of objects at a large distance is imaged, as well as detector surfaces with reduced optical sensitivity, which are advantageously effective at a shorter target distance. In this connection, 100% optical sensitivity should correspond to the normal, unreduced optical sensitivity, for example of a semiconductor sensor, at a certain wave length.

With this configuration according to the invention, the size of the structures of the detector surfaces, which are ultimately definitive for the required adjustment tolerances, are advantageously decoupled from the optical sensitivity of the detector.

With the inventive device, the varying sensitivity of the active detector surface can thus, for example, result from a variably thick, respectively optically dense, layer of an absorptive medium applied to the detector surface.

A filter of this type, which, for example, can be structured as a neutral density filter, can, for example, be implemented in that a variably thick layer of an absorptive medium is deposited onto the detector surface of a semiconductor chip. This allows for the implementation of an especially even transition. A smoother, more gradual transition is thereby advantageously implemented between regions with substantially 100% optical sensitivity and regions with considerably reduced sensitivity, for example 1% sensitivity.

Different reflectivities of the detection surface can also alternatively be used.

It is also conceivable for a plurality of absorptive layers to be deposited onto the detector surface, the different layers being characterized by different absorption coefficients or one and the same absorption layer being repeatedly deposited with different masks.

In an alternative embodiment of the device according to the invention, the varying sensitivity of the active detector surface can also result from a grid mask of varying grid size or grid density being applied to said detector surface.

Provision can be made in additional embodiments for at least one discrete transition to be present between a region with substantially 100% sensitivity and a region with reduced sensitivity. It is advantageous for a plurality of transitions of this type to be implemented on the detector surface.

An attractive alternative from a technical standpoint consists of attaining surfaces of neutral density filters of variable transmission with the aid of a combination of a completely intransparent coating and a grid mask. In one advantageous configuration of the device according to the invention, the varying optical sensitivity of the active detector surface is thereby implemented by a grid mask applied to the detector surface. The variation in the optical sensitivity can thereby be produced by a varying grid size or also by a variation in the density of the matrix dots.

This corresponds to a rasterization as it is used, for example, in print media when printing neutral density surfaces of varying density. In the case of the inventive device, different relative surface areas are thereby in each case covered by the intransparent material with the aid of a finely structured pattern in different surface elements of the active detector surfaces. When an average is taken over the minimally resulting spot diameters of the returning measurement signal, a progressively variable optical sensitivity of the detector also then results.

The advantage of a "rasterized" neutral density filter with progressive graduation is that existing technologies can be accessed when processing the semiconductor, which serves as a detector. In comparison with known detectors, a detector of this type can therefore be manufactured with a 100% sensitive detector surface without any additional costs.

Among other things, a, for example, lamellar, regular pattern or even a pseudo-random dot pattern with small to very small individual dots is worth considering as a matrix. The minimum structure size is thereby predetermined by the manufacturing technology of the semiconductor process.

In addition the optical sensitivity of the detector can be advantageously reduced because of the fact that an optically active surface tapering in the direction of a beam displacement for decreasing target object distances is used, and this effect also enables less signal of the returning measurement signal to impact the detector.

Additional advantages of the device according to the invention are made apparent in the following description of several examples of embodiment.

BRIEF DESCRIPTION OF THE DRAWINGS

Exemplary embodiments of the device according to the invention are depicted in the drawing. The description, the associated figures as well as the claims contain numerous characteristics in combination. A specialist in the field will consider these characteristics—and particularly the characteristics of various exemplary embodiments—individually and will combine them to form further reasonable combinations.

DETAILED DESCRIPTION

An inventive device for optically measuring distance is depicted in a schematized manner in FIG. 1 including the most important components, whose function will be described. The inventive device 10 includes a housing 11, in which a transmission unit 12 for generating a measurement signal 13 and a receiving unit 14 for detecting the measurement signal 16 returning from a target object 15 are disposed.

Figure 1:
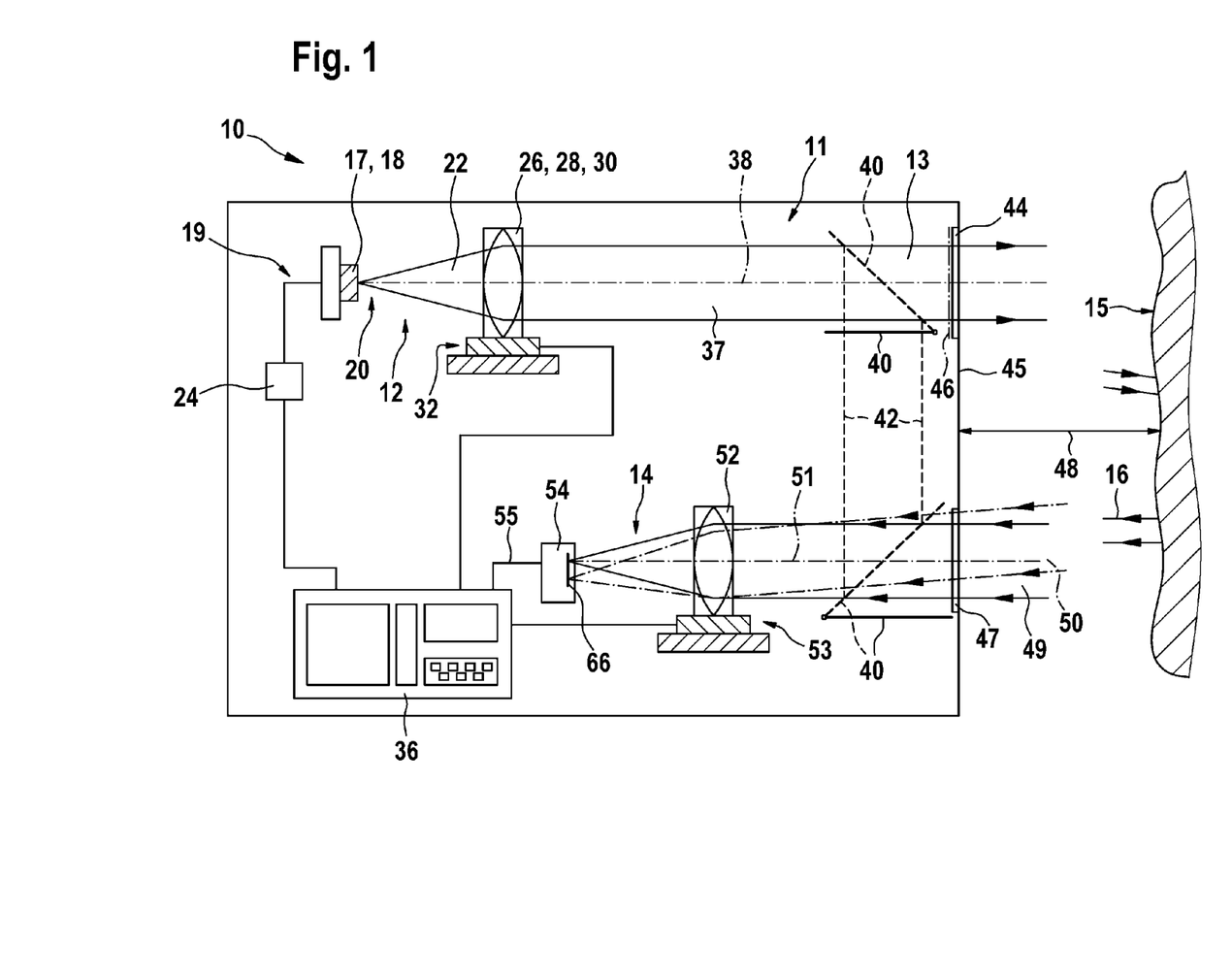
FIG. 1 shows a schematized view of an exemplary embodiment of an inventive device for optically measuring distance.

The transmission unit 12 includes a light source 17, which is realized as a semiconductor laser diode 18 in the exemplary embodiment shown in FIG. 1. It is also possible to use other light sources in the inventive device. The laser diode 18 emits a laser beam 20 in the form of a light bundle 22 that is visible to the human eye. Green, red or blue light are advantageously used in this instance.

The laser diode 18 is operated via a control unit 24, which modulates the electrical input signal 19 of the diode using appropriate electronics. Via a modulation of the diode current carried out in such a manner, it is ensured that the optical measurement signal 13, which is used to measure distance, is likewise modulated in a desired manner.

The laser beam bundle 20 then passes through collimation optics 26 designed as a lens 28, which is depicted simply as a single lens 30 in FIG. 1. In this exemplary embodiment, the lens 28 is optionally situated on an adjustment device 32, which basically serves to change the position of said lens in all three spatial directions, e.g., for adjustment purposes.

As an alternative, collimation optics 26 can, however, also already be a component of the laser diode 18, or they may be fixedly connected thereto.

After passing through the lens 28, an, e.g., amplitude-modulated signal 13 results in the form of a parallel light bundle 37, which propagates along the optical axis 38 of transmission unit 12, as depicted schematically in FIG. 1. A preferably switchable beam deflector 40 is also situated in the transmission branch 12. Said beam deflector 40 makes it possible to redirect the measurement signal 13 directly, i.e. inside the device, to the receiving unit 14 of the device 10 and in so doing to avoid a target object. In this manner, a reference path 42 inside the device is created, which may be used to calibrate or compensate for the measurement system.

When a distance measurement is carried out using the inventive device, the measurement beam 21 leaves the housing 11 of said inventive device via an optical window 44 in the front wall 45 of said device 10. The opening of the optical window may be secured, e.g., with a shutter 46. To perform the measurement, said measuring device 10 is pointed at a target object 15, whose distance 48 from said measuring device is to be ascertained. The signal 16, which is reflected or scattered on the desired target object 15, forms a returning ray bundle 49, respectively 50, a certain portion of which moving back into said measuring device 10.

The returning measurement radiation 16 is coupled into the measuring device 10 through an entrance window 47 on the front side 45 of said device 10. In the exemplary embodiment shown in FIG. 1, measurement radiation 16 is deflected to the reception optics 52.

Two returning measurement beam bundles 49, respectively 50, for two different target object distances 48 are exemplary sketched in FIG. 1 for purposes of illustration. For large object distances—and large in this instance meaning large when compared with the focal distance of the reception optics 52—, the signal 16 returning from the target object enters parallel to the optical axis 51 of the receiving unit 14. In the exemplary embodiment depicted in FIG. 1, this case is represented by the measurement beam bundle 49. As the object distance decreases, the returning signal 16 that enters the measuring device becomes increasingly slanted relative to the axis 51 of the receiving unit 14 due to parallax. Beam bundle 50 is drawn in FIG. 1 as an example of a returning measurement beam bundle of this type located within close range of the distance-measuring device.

The reception optics 52, which are also depicted only schematically as a single lens in the exemplary embodiment in FIG. 1, collimates the returning measurement signal 16 and focuses its beam bundle onto the photosensitive surface 66 of a reception detector 54. The detector 54 includes at least one photodiode for detecting the optical measurement radiation, e.g., a PIN diode, an APD (Avalanche Photo Diode) or at least one CCD chip as a photosensitive element 66. Of course, other surface detectors known to the specialist in the field may also be used as reception detectors. The surface detector is typically oriented such that its active photosensitive surface 66 is perpendicular to the optical axis of the reception branch. The incident optical signal is converted by the reception detector 54 into an electrical signal 55 and is supplied to the inventive device for further evaluation in an evaluation unit 36.

The reception optics 52, which are likewise mounted on an adjustment device 53 in the exemplary embodiment in FIG. 1 but are not limited thereto, are situated approximately at their focal width away from the active surface 66 of the detector, so that incident radiation arriving from a target object located far away from the measuring device is essentially focused on the detector, respectively the active photosensitive surface thereof.

When the distances from the target object are small, it should be noted, however, that the image position of the measurement spot that is reflected or scattered on the target object is located increasingly further away from the focal point of the reception lens. Therefore, as the distance between the target object and the measuring device decreases, the returning measuring beam travels increasingly further away from the optical axis of the receiving unit, thereby deviating more and more from the optical axis of the transmission unit. In addition, the returning measurement beam bundle is no longer focused exactly on the detector surface due to the changed imaging conditions on the reception lens. As the target object distance decreases, the size of the measurement spot on the detector surface increases.

The optical axes of the transmission and receiving system have a finite parallel displacement (parallax). In practice, this displacement is predetermined by the diameter of the reception lens 52 and realistically lies in the magnitude of approximately 1-3 cm.

Additional components situated in the measuring device, which are not related to what is required to understand the inventive device, will not be discussed further in this context.

It should merely be noted that the measuring device, of course, also includes a control and evaluation unit 36.

Figure 2:
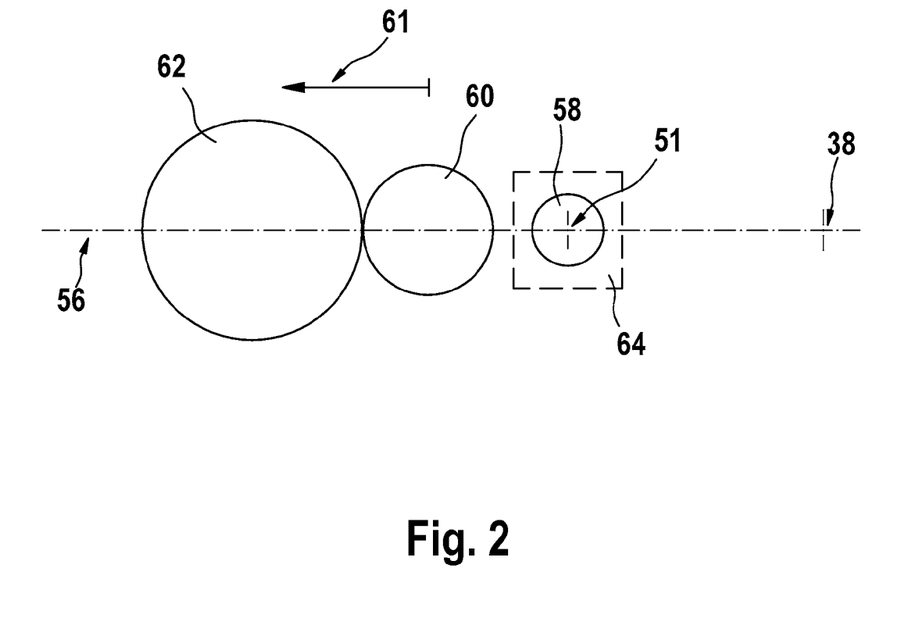
FIG. 2 shows a schematized depiction of the variation of the returning measurement beam bundle in the detection plane when the distance to the object to be measured varies.

The relationships between the distance of the target object from the measuring device and the position, respectively size, of the measurement spot on the detector surface are schematically depicted in a qualitative manner in FIG. 2 for the purpose of obtaining an improved overview.

In so doing, FIG. 2 shows a top view of a detector surface 64 according to the technical field in the direction of view of the measurement signal 16, which is returning from the measurement object. Reference numeral 56 denotes the common plane of the optical axis 38 of the transmission unit 12 and the optical axis 51 of the receiving unit 14. The measurement spot 58 of the returning radiation 16 for very large object distances 48 is located on optical axis 51 of said receiving unit 14 and is focused in the form of a small spot on the surface 64 of the detector. Since the detector 54 is located approximately at the distance of the focal width of the reception optics 52, light that optically speaking comes from infinity is focused directly onto the detector surface due to the principles of optical imagery. A "classical" detector surface 64 of a detector according to the technical field is drawn in as a dashed line in FIG. 2 in order to illustrate said relationships.

As the distance 48 of the measuring device 10 from a target object 15 decreases, the returning signal 16 strikes the reception lens 52 at an increasing slant so that the measurement spot on the detector surface also travels in the direction of arrow 61 in FIG. 2.

The measurement spot 60, which is likewise sketched in FIG. 2, for a short object distance 48 of the target object 15 from the measuring device 10 has therefore traveled away from the optical axis 51 of the reception device, and it is greatly enlarged in terms of its expansion, in particular its lateral expansion.

When the measurement distance 48 of the measurement object 15 from the measuring device is very short, a measurement spot 62 of the returning measurement signal 16 appears in the detector plane, which is once again considerably increased in size and also comes to rest further away from the optical axis 51 of the receiving unit 14. For very short object distances, a displacement of this type of the measurement spot, which is to be detected, as a function of the distance 48 between a measurement object 15 and a measuring device 10 can as the case may be result in the returning signal 16 no longer striking the active surface 64 of the measurement receiver 54, as indicated by the surface 64 of a 'classical" measurement receiver shown in FIG. 2 using a dashed line.

Figure 3:
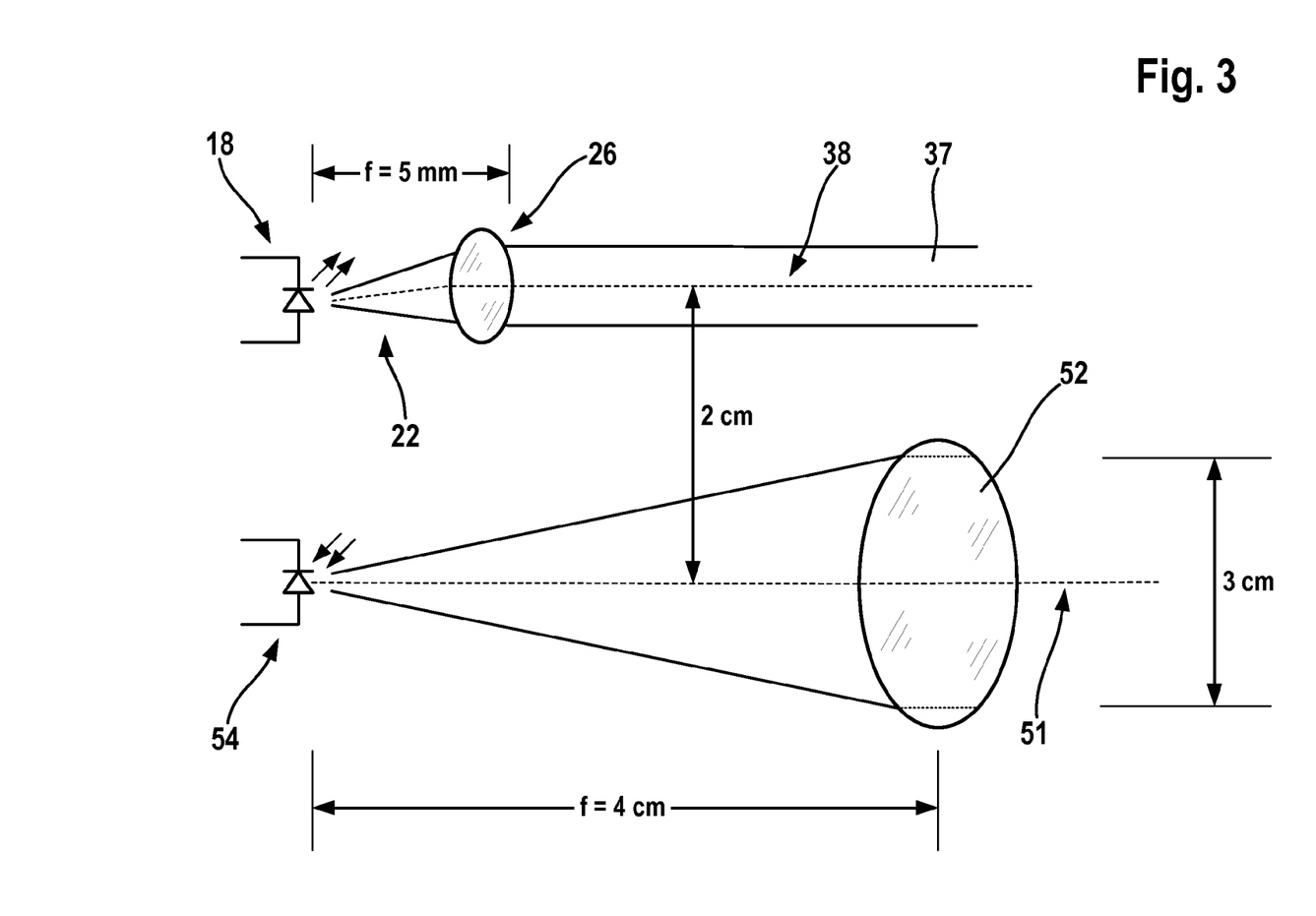
FIG. 3 shows a sizing example for the optics of a device according to FIG. 1.

FIG. 3 shows a concrete sizing example, which is used in the following sections for the purpose of illustration, with a parallax of 2 cm, a reception focal width of 4 cm and a lens diameter of the reception optics of 3 cm. The reference numerals thereby correspond to the components in FIG. 1.

The parallel displacement of the optical transmission and reception axes leads to the light reflected by the target object reaching the photodetector with a varying incidence angle depending on the distance 48. Depending on the distance 48, this varying incidence angle leads as a result to the light reflected by the target object striking the detector plane at laterally displaced locations. As the distance to the target decreases, the spot consequently "moves" away from the optical axis 51 of the detector optics. Simultaneously with this lateral movement, the amplitude of the light imaged into the detector plane increases in an inverse square manner with the reduced distance.

Figure 5:
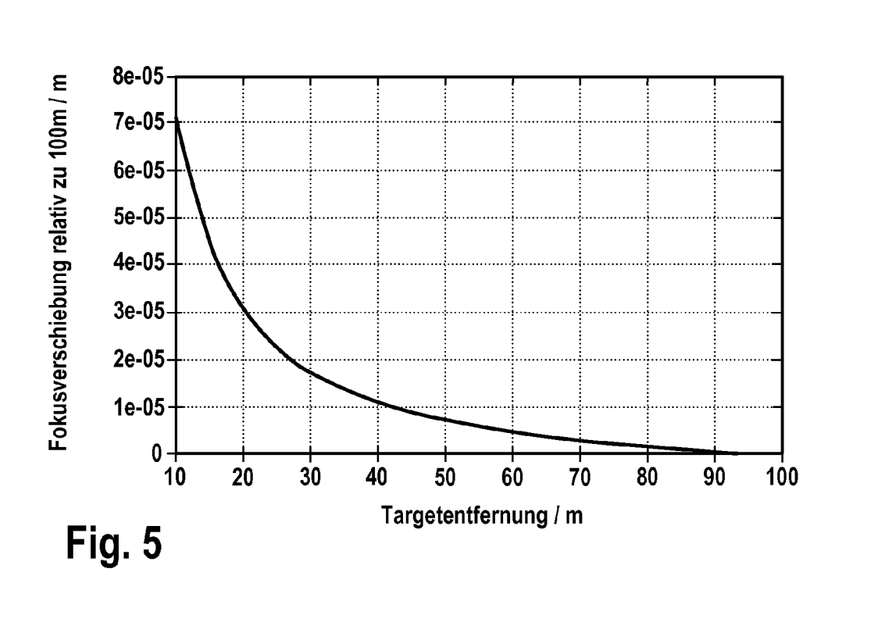
FIG. 5 shows a depiction of the variation of the focus position in the detection plane as a function of the target distance for the sizing example according to FIG. 3.

This functional correlation of the position on the detector as a function of the target, respectively measurement, distance is reflected in FIG. 5.

The lateral movement of the focus in the focal plane initially occurs relatively "slowly" when object distances 48 are large, i.e. the change in position of the focus is rather small when the distance changes.

In regard to the optical parameters according to FIG. 3, a movement of the spot center in the focal plane of the reception lens of only about 8 μm results as the target distance 48 is changed from 100 m to 50 m.

The effect of this lateral movement is more considerable for very short distances 48. Thus, a lateral displacement of, for example, 2 cm results at a distance 48 of only 4 cm to the target.

Figure 4:
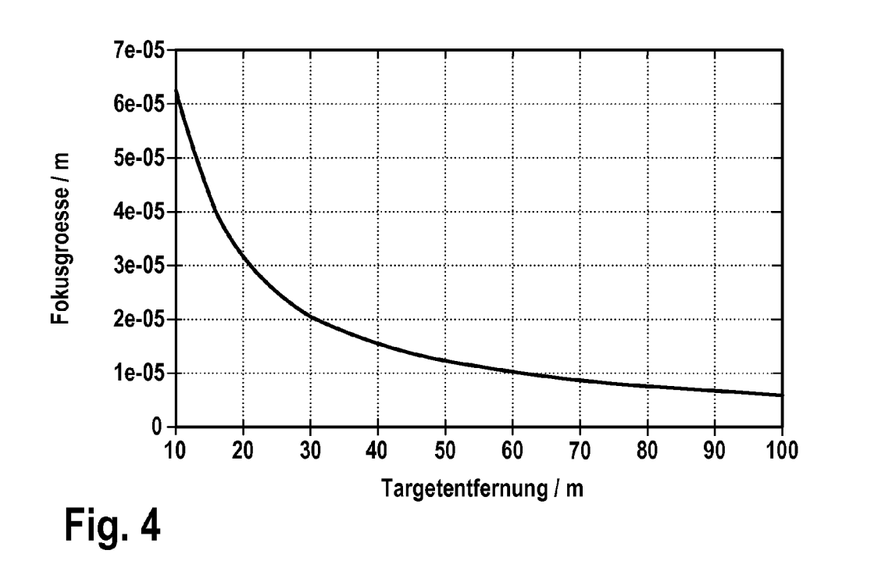
FIG. 4 shows a depiction of the variation of the focus size in the detection plane as a function of the target distance for the sizing example according to FIG. 3.

The spot diameter of the returning signal resulting in the focal plane also becomes larger simultaneously with the lateral travel of the measurement signal to be detected. When the focusing is perfect for a selected distance 48 to the target, the size of the spot of light appearing in the image plane of the detector 66 is first and foremost a result of the optical aberrations of the reception lens system and as the case may be as a result of a diffraction of the aperture of the reception lens. Spot diameters of 10 μm at a focal width of the reception lens 52 of about 4 cm are thus entirely technically feasible. A typical course of the focus size as a function of the distance of the measuring device to the target, as it results from the dimensioning variables according to FIG. 3, is schematically depicted in FIG. 4.

In practice the reception optic system is adjusted such that a minimum spot diameter results for large distances, for example at a target distance 48 of 100 m. It can thus be ensured that the weak measurement signal from a large distance reaches the photodetector as completely as possible. An irradiation of the active detector surface due to poor focusing, which leads to a reduction of the useful signal that is already weak at a large distance, can also be avoided in this way.

In the usual event that provision is not made for an adaptive refocusing, a reduction in the target distance 48 leads to an enlargement of the spot in the focal plane of the reception optics.

If the resulting focus diameter is plotted as a function of the target distance 48 (see FIG. 4), only a slight enlargement of the focus initially occurs as the distance decreases. The enlargement of the focal point resulting from the defocusing is overlapped by the lens aberration which is already present. Hence, if the shape of the useful light imaged into the focal plane 66 is considered as a function of the target distance 48, a primarily "traveling" image point in the focal plane, which varies little in size, ensues. Only at comparatively short measurement distances 48 of, for example, 30 m are increasing spot diameters of, for example, 20 μm readily observed. At a measurement distance of 10 m, i.e. the distance of the measuring device to the target object to be measured, a spot diameter of typically around 50 μm ensues.

The increase in the spot diameter of the returning signal onto the detector surface does not, however, compensate for the enlarged lateral displacement due to parallax to a great extent. In order to image light onto the detector in the immediate close range, it would be necessary to expand the detector size several centimeters. This cannot be practically implemented.

Therefore in order to still image sufficient light onto the detector even when the distance to the target to be measured is only a few centimeters, the reception lens can also alternatively be configured such that a portion of the lens surface is shaped in such a way that light from close range also reaches the detector. Analogous to ophthalmic optics, a "progressive power" lens can then be spoken of to a certain extent, with which different portions of the lens surface are active for different distances. The difference to ophthalmic optics is thereby only that a sharp image is not required. On the contrary, it must only be ensured that just some light reaches the detector.

The target object to be measured is generally not located in darkened spaces. Therefore besides that light, which is reflected by the target object due to the illumination by the transmission light source, ambient light also reaches the detector. Said ambient light is represented in the electrical measured variables as a result of a noise-like interference signal being superimposed onto the measurement signal received by the photodetector.

The parameter decisive for the measuring capacity of the laser rangefinder is in this instance the ratio between the measurement signal incident on the photodetector and the interference signal caused by the ambient light. It can thereby be optically assumed that the ambient light, which is imaged into the focal plane of the reception optics, leads to a quasi homogeneous illumination in the vicinity of the optical axis.

The desire to reduce the ratio of ambient light to useful light thereby requires a reduction of the active detector surface. This is, however, in practice only possible within limits. This fact becomes apparent when considering a simple numerical example:

If an especially small detector with a diameter of only 10 µm—which would correspond to the optimal focus achieved at 100 m—is, for example, used, the ratio between useful and ambient light is thus optimal for the case of the focusing being perfect at a fixed target distance. A change in the target distance to 50 m resulting in the parallel displacement of the spot in the focal plane, however, then already leads to the useful light practically no longer reaching the detector. This signal decrease is only compensated for to a small extent by the quadrupling of the optical power (according to the inverse square law). In a configuration of this type, the rangefinder has only a very narrow window of usage.

At the same time with regard to a small detector of this type, the demands placed on the adjustment tolerance of the reception lens system are obviously very high. The useful light no longer reaches the active detector surface already at a displacement of the position of the reception lens 52 relative to the photodetector 52 of only 10 µm. The manufacture of a range finder of this type would therefore involve high demands on the adjustment tolerance.

An isolated optimization of the signal-to-noise ratio by minimizing the detector surface is technically impracticable as illustrated above. The active detector surface must therefore be for all intents and purposes considerably enlarged in comparison with the optimal spot size.

Silicon photodiodes are primarily used as photodetectors, in particular avalanche effect photodiodes. A characteristic of these photodiodes is that there is no problem in for the most part freely creating the active detector surface by covering with metal layers. In order to be able to further process the individual photodetectors after separation and during insertion into the housing, a minimum edge length of the silicon plates is required from, for example, around 500 µm×500 µm. Within this base surface, the exact structure of the element exposed to the light can be virtually freely predetermined with accuracies down to a few micrometers using photolithographic masks. The portions of the photodetector, which are to be inactive, are covered with a non-transparent layer after the lithographic process.

If a circular element with a 30 µm (???) diameter is, for example, selected, a considerably simplified adjustment is the result. The focus of the useful signal then also remains completely on the detector in a larger local interval. This simplification is, however, gained by paying the price of a considerably enlarged noise signal due to considerably more ambient light reaching the detector.

An additional complication ensues by the fact that the absolute values of the measurement signal strongly depend on the target distance 48. Thus, a signal amplitude that is greater by a factor of 100 arises, for example, at a distance of 10 m in comparison to 100 m provided that all of the light reaches the detector. This poses the risk of overmodulating the measuring amplifier at too small of a distance. A simple enlargement of the detector surface therefore likewise causes problems. For that reason, the measurement signal, which reaches the photodetector when the objects are nearby, i.e. when the target distances are short, is ideally deliberately damped. Only for large distances, whereat the signal amplitude is low, should preferably 100% of the light be acquired.

In order to deal with this problem, it is proposed in the German patent publication DE 101 30 763 A1 that the active detector surface be reduced in the case of reduced target distances 48 as a result of the detector surface tapering as the distance increases away from the optical axis such that the original detector surface runs out in the shape of a narrow strip. The detector surface is shaped considerably narrower than the spot size there where the optical signal from targets in close range is imaged into the focal plane, so that only a fraction of the light is acquired. An active damping of the signal can be achieved by means of this measure. The dynamics of the signals, which, for example, a measurement amplifier has to be able to block out in order to be operable for short as well as large object distances, can be reduced in this manner.

A detector having a surface with a linear run-out or also the provision for a punctiform auxiliary detector for the close range, as it is known from the German patent publication DE 100 51 302 C2, has, however, the disadvantage of the adjustment becoming critical, in particular provided that the enlargement of the focus spot due to the reduced distance is still not noticeable.

In both cases addressed from the technical field, the compensation for the high signal dynamics is based on only a small portion being cut out of the spot which results for short object distances. The active detector surface consequently has to be considerably smaller than the spot size. Should, for example, a linear strip be cut out of a spot with a diameter of 20 µm, said strip containing roughly 10% of the light output of the total spot, the width of the line must then assume a small value between 1 and 2 µm.

Covering masks for silicon detectors in fact generally allow for such small structural sizes; however, the problem remains that the position of the spot in the image plane, that is to say the optics' adjustment, must be implemented with a comparably close tolerance. That would mean in the example presented in the above section:

In order to stably achieve a damping of 10% by means of "cutting out" a narrow strip from the image spot; in addition to ensuring a strip width of roughly 1 µm, it must also be ensured that the center of the spot is imaged exactly concentrically onto the strip down to a few micrometers. An offset in height has an immediate effect because of the fact that the actually desirable damping of the signal is significantly greater than planned.

In order to keep the positioning tolerance for the photo detector small and at the same time achieve a deliberate damping of the signal portions at short object distances, it is proposed according to the invention—in particular while maintaining a spacious and cohesive detector surface—for different sensitivities to be associated with different surface elements within this detector surface. In other words, the inventive device is characterized in that the surfaces, which are reached by light when the distance to the object becomes increasingly shorter, are to be covered with an increasingly denser optical filter. Detector surfaces then result having substantially 100% sensitivity, into which the light from objects at a large distance is imaged, and detector surfaces having a reduced sensitivity, which take effect at a shorter distance, also result.

The size of the structures of the detector surfaces, which ultimately are of primary importance for the required adjustment tolerances, is thereby advantageously decoupled from the optical sensitivity.

Figure 6:
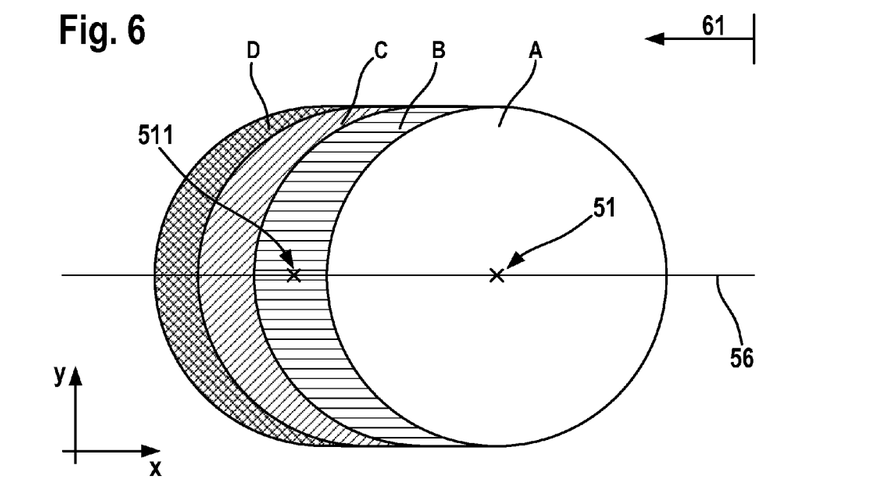
FIG. 6 shows a schematized top view of a first embodiment of the detection surface of a detector of the inventive device, FIG. 7 a schematized top view of a second embodiment of the detection surface of a detector for an inventive device, FIG. 8 a schematized top view of a third embodiment of the detection surface of a detector for an inventive device.

Diagram 6 shows a schematic top view of the active surface of an exemplary embodiment of a photodetector according to the invention. A circular surface, wherein the surface of the photodetector is not covered, can thereby be seen in the region on the right side; hence, a sensitivity of 100% is achieved. The light, which is reflected by objects at a large distance and which have only a small intensity due to said large distance, is imaged so that the maximum sensitivity of said photodetector is required.

Due to the finite parallax, light, which is reflected from targets at a shorter distance, generates a focal point, which is centered at a laterally displaced position 511, i.e. is centered at a point, which when compared to position 51 is displaced with respect to the direction 61 (x-axis in FIG. 6) for object distances that are decreasing. The increase in the intensity, for example by a factor of 2, resulting on account of the shorter distance to the target is thereby compensated for in that the effective sensitivity of the photodetector in the region B of point 511 is, for example, reduced by 50% by means of a suitable coating.

In this configuration, a slight maladjustment in the direction orthogonal to the direction 61 (y-axis in FIG. 6) has no effects on the compensation for the optical signal amplitudes that are dependent on the distance.

Figure 7:
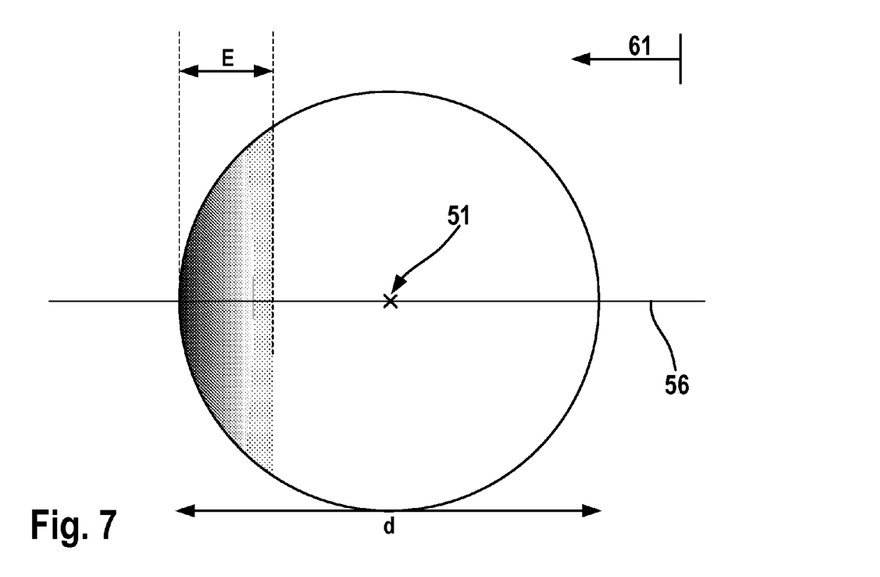

A schematic change in sensitivity is shown in FIG. 6 with the aid of 4 discrete individual zones having 4 discrete transmission values. A sensitivity distribution could, for example, be selected wherein A=100%, B=50%, C=30% and D=10%. It is, of course, also possible for the sensitivity to be alternatively staggered. It is also conceivable to replace the "graduated" filter implementation shown with continuous transitional characteristics, e.g. by a continuous, for example linear, increase in the attenuation coefficient—or a said increase in the attenuation coefficient according to a quadratic relation—being implemented up until if need be a complete damping, as this is also depicted in FIG. 7.

A filter of this type as it is shown in FIG. 6 and which can be configured as a neutral density filter, can, for example, thereby be implemented in that a layer of an absorptive or partially reflective medium of varying thickness is deposited on the detector surface of a semiconductor chip. Due to the varying thickness of the layers, different transparencies result so that different amounts of light reach the semiconductor surface and can be detected. This also allows for an especially smooth transition to be implemented. An especially smooth, gradual transition between regions having substantially 100% optical sensitivity and regions having a considerably reduced sensitivity, for example 0% sensitivity can also thereby be advantageously implemented.

Deviating from the circularly symmetrical basic geometry of the detector surface shown in Diagram 6, it is also conceivable as an alternative to use a quadratic or rectangular or an otherwise advantageously configured basic shape or to utilize an alternative geometric topology. The exact shape is thereby efficiently selected such that the maladjustment tolerances, which can be implemented, are taken into account in the given system, and on balance a system results that is particularly easy to manufacture.

In an exemplary embodiment of the photodetector according to the invention, the reduced transmission on the semiconductor surface of the detector is thereby implemented as a result of the surface areas corresponding to the attenuation factor being locally covered with the aid of an intransparent material. Metal layers appear to be particularly well suited for this purpose. For example, finely structured line elements, hatches or regular or pseudo-random dot patterns are suited for producing a grid of this type. In the case of dot patterns, single points with equal, regular position and with varying size depending on the desired damping of the measurement signal can, for example, be used. As an alternative, single points with equal diameters and variable thickness can be used. A combination of both parameters also achieves the desired effect. The optical sensitivity of the detector surface is then determined via the density of the grid elements on the active detector surface—averaged over the beam diameter of the optical signal. All of the rasterization methods from the graphic technology utilized for obtaining graduated shades of grey are generally worth considering in this instance. Relatively irregular, pseudo-random pattern structures have in this case the advantage of being relatively less problematic with regard to the lift-off processes for semiconductor coatings than regular structures, as, e.g., hatches.

As an alternative to a "rasterization" of the desired greyscales, a partially reflective or partially absorbent coating can be utilized. The advantage of a partially absorbent layer is that continuous transitions can be particularly advantageously produced. In so doing, the option is particularly to be emphasized, which modifies regional damping factors by varying the layer thicknesses.

The spatial expansion in the X- and Y-direction (see FIG. 6) of the entire optically active surface of the photo detector, i.e. up to the edge of the photoactive region with reduced sensitivity, expediently amounts to 0.3 to 2 mm, in particular 0.4 to 1 mm, as semiconductor detectors with this total size can be especially cost effectively manufactured.

In the case of this detector size that can be cost effectively implemented, the achievable regional window, at which an optical minimum output reaches the detector, does not include the immediate close range (e.g. of a few centimeters). Because of this fact, the photodetector from Diagram 6 is used in an optical system in an especially advantageous embodiment, light from the immediate close range being deflected in said system onto the detector by means of progressive power optics. The exact shaping of the optical surfaces of the imaging optical system is thereby responsible for the amplitudes and distance correction at close range, e.g., for the range of distance from 5 cm to 4 m from the leading edge of the rangefinder. The special configuration of the geometry and the structure of the detector surface are then to be optimized with regard to the amplitude correction of the reception signal in the transition region between 4 m and, for example, 50 m.

An alternative and advantageous shape for the detector surface of the inventive device is shown in FIG. 7. On one side, an edge region E of a circular photodetector is selectively covered with a filter whose attenuation gradually increases. The diameter d of the detector amounts to typically around 100 μm.

Figure 8:
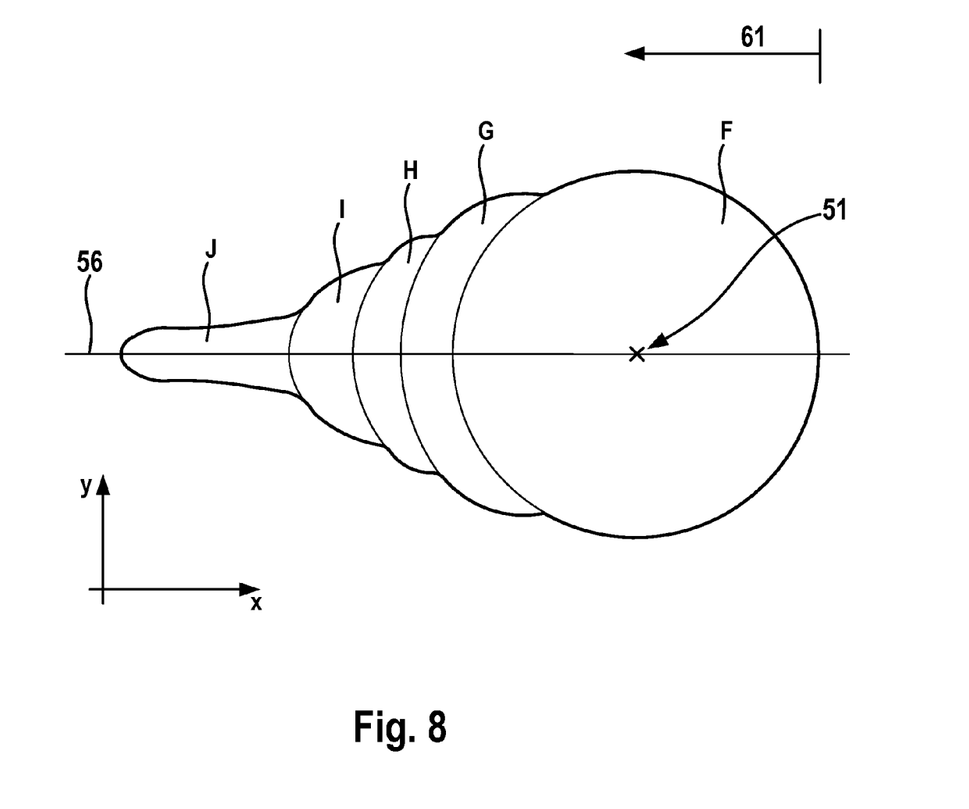

FIG. 8 shows a further embodiment of the detector surface according to the invention. The basic idea from the exemplary embodiment of FIG. 6 is thereby combined with the geometric shape of the German patent publication DE 10 130 763 A1, wherein a reduction in intensity is thereby exclusively implemented as a result of only a predetermined fraction being geometrically "cut out" from the defocused spot for short target distances by the tapering detector surface. In comparison to a design on the basis of the German patent publication DE 10 130 763 A1, the expansion of the tapered detector surface in the direction orthogonal to the direction 61 (y-axis in FIG. 8) is considerably larger in the present exemplary embodiment because the signal attenuation comes about in this instance by a combination of the geometric "cutting out" resulting from the tapering of the shape of the detector surface and an additional signal attenuation by means of the adapted transmission of the photodetector. The structure sizes can thereby become significantly larger so that a maladjustment of the optics in the direction of the y-axis has less of an influence than would be the case if a damping coating on the surface of the photodetector was dispensed with. The detector according to FIG. 8 includes 5 discrete sensitivity regions F,G,H,I,J of varying geometric style of design. A possible staggered arrangement of the sensitivity values could thereby, for example, be: F=100%, G=50%, H=30%, I=10%, J=5%.

The number as well as the shape as well as the optical sensitivity values of the individual segments of the detection surface are not limited to the concrete exemplary embodiment.

A gradual, respectively continuous, transition of the sensitivity, as it is described in the exemplary embodiment of FIG. 7, can be combined with a design according to FIG. 8 or an alternative design.

An analogous combination of advantageous, alternative detector surfaces, as they are described in the German patent publication DE 10 2006 013 292 A1, with the implementation of optical filter surfaces is, for example, possible within the scope of the invention.

The present invention is also applicable to systems known from the technical field, which have a plurality of independent, non-cohesive detector surface parts of a detector. These systems, like those of the German patent publication DE 100 51 302 A1, use individual surface parts for the detection of light reflecting from targets at a close distance to the measuring device (These discrete surface parts are disposed laterally offset from the optical axis.) and others, which are surface parts separated from the first surface parts, on which light emanating from the targets from a large distance is imaged. (These second surface parts are placed on the optical axis of the reception system.)

In order to make an approximately distance-dependent amplitude, the size of the first surface elements associated with the close range are considerably smaller than the surface of the far range surface parts with these devices from the technical field. Particularly the small size of the close range surfaces represent, however, a high demand on the adjustment precision of the positioning of reception lenses and on the photodetector. This results from the fact that the focus spot of the light to be bundled onto the detector from close range must centrically strike a much smaller detector surface.

If the inventive filter structures described above are used, the individual surface of discrete surface elements can be considerably enlarged at very comparable optical sensitivities. If, for example, an attenuation of the measurement signal by the proposed filter structures is implemented by a factor of 16, the linear expansion of the close range surface element, e.g., the diameter of a surface part, which is configured disc-shaped, is enlarged by a factor of 4. The demand on the adjustment tolerance is thereby advantageously likewise reduced by a factor of 4.

The adaptation of the sensitivity according to the invention can consequently be implemented with one or also a plurality of the discrete partial surfaces of the present detector surface.

The additional degree of freedom-detector sensitivity, which is made available to the developer when designing the optical system by means of the subject matter of the present invention, is used for the purpose of optimizing the four design goals stated above (distance range, amplitude dynamics, total active detector surface, adjustment tolerance sensitivity) in a particularly advantageous manner.

The inventive device particularly allows for the size of the structures of the detector surface, which is ultimately decisive for the required adjustment tolerances, to be decoupled from the optical sensitivity of the detector.

The invention claimed is:

1. Device for optical distance measurement comprising:
a transmission unit with a light source for emitting optical measurement radiation onto a target object; and
a receiving unit arranged at a distance from the optical axis of the transmission unit and equipped with at least one optical detector for receiving optical radiation reflected from the target object, wherein the detector of the receiving unit comprises:
at least one detection surface, the optical surface of which has varying optical sensitivity in the direction of a beam displacement for decreasing target object distances,
wherein different optical sensitivities are associated with different surface elements within a cohesive detector surface.

2. Device according to claim 1 wherein the optical sensitivity of the optically active surface decreases in the direction of a beam displacement for decreasing target object distances.

3. Device according to claim 1, wherein the varying optical sensitivity of the active detector surface results from a layer of varying thickness of an absorptive or reflective medium applied to the detector surface.

4. Device according to claim 1, wherein the varying sensitivity of the active detector surface results from an intransparent grid mask of varying grid size, which is applied to said detector surface.

5. Device according to claim 1, wherein a continuous transition (E) between a region with substantially 100% optical sensitivity and a region with considerably reduced optical sensitivity, in particular one with substantially 0% optical sensitivity, is present.

6. Device according to claim 1, wherein at least one discrete transition between a region with substantially 100% optical sensitivity and a region with reduced optical sensitivity is present.

7. Device according to claim 1, wherein the optical sensitivity of the detector is additionally reduced by virtue of the fact that an optically active surface is used, which tapers in the direction of a beam displacement for decreasing target object distances.

8. Device according to claim 1, wherein the light source is a laser.

9. Device according to claim 8, wherein the light source emits radiation in the wave length range of the spectrum of electromagnetic waves, which is visible to the human eye, in particular green light.

10. Device according to claim 1, wherein the device for optical distance measurement is a handheld device.

* * * * *